WORKMAN'S TIME RECORDER
Filed Jan. 6, 1958
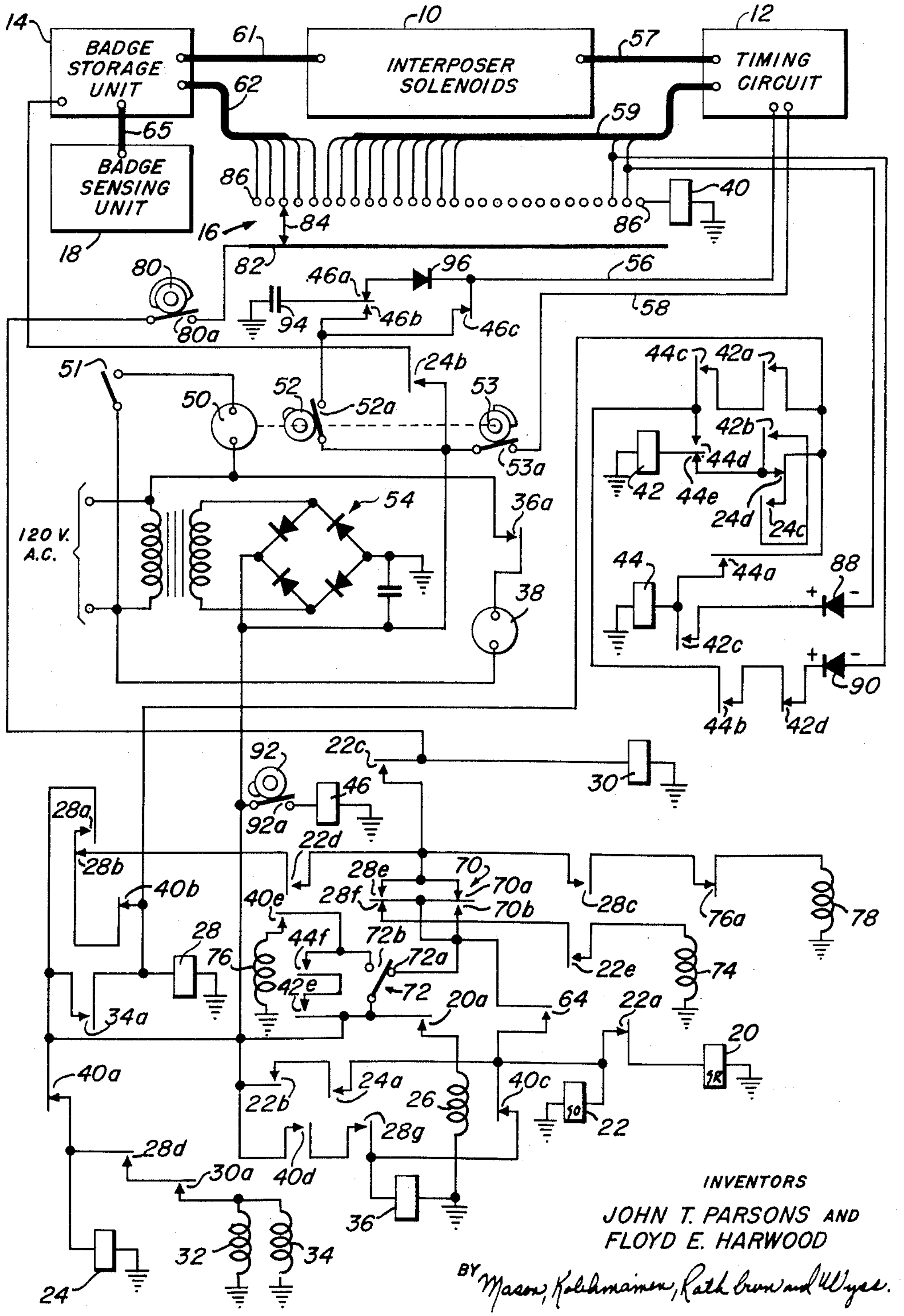
INVENTORS
JOHN T. PARSONS AND
FLOYD E. HARWOOD
BY Mason, Kolehmainen, Rathburn and Wyss.
ATTORNEYS 3,020,115

WORKMAN'S TIME RECORDER

John T. Parsons, Traverse City, and Floyd E. Harwood, Ypsilanti, Mich., assignors to Parsons Corporation, Traverse City, Mich., a corporation of Michigan Filed Jan. 6, 1958, Ser. No. 707,254
10 Claims. (Cl. 346—54)

This invention relates to a recording apparatus and, more particularly, to new and improved means for controlling a time recorder of the type shown in a copending application of John T. Parsons and Floyd E. Harwood, Serial No. 674,131, filed July 25, 1957, which copending application is assigned to the same assignee as the present application.

In general, the time recorder disclosed in the above identified application consists of a timing circuit having switches which are continuously adjusted to settings representing instant time and a group of storage relays which are selectively operated by a sensing unit in response to the insertion of a coded key or badge into the sensing unit to store digits forming the designation of an employee. The time recorder is placed in operation by the insertion of a blank record card into a guideway leading to the punching assembly and by the insertion of a coded key into the sensing unit. During a cycle of operation, a commutator in the recording apparatus sequentially interconnects a plurality of interposer solenoids in the punching assembly with the various switches in the timing circuit and the various groups of digit storing relays so that these items of information are punched at longitudinally spaced positions on the record card. Following the completion of the recording operation, the punched card is ejected from the time recorder.

One disadvantage of the above described time recorder is that the badge sensing unit can be operated by inserting a badge into the sensing unit so as to selectively operate the plurality of the storage relays. If the badge or key is removed from the sensing unit without then inserting a blank record card, the plurality of storge relays remains selectively operated in accordance with the previously sensed badge. Thus, when a blank record card is subsequently inserted into the recording assembly, the previously stored badge number is recorded on the card in conjunction with instant time rather than the badge number of the employee inserting the card.

Accordingly, one object of the present invention is to provide a control circuit for a time recorder which requires the presence of a record medium in the recorder before the sensing unit can be operated to store a badge number.

In the time recorder disclosed in the above identified copending application, the timing circuit is operated at time spaced intervals by signals applied from a motor driven timing mechanism. In order to prevent the adjustment of the stepping switches included in the timing circuit during an interval in which time is being recorded by the punching assembly, an interlock arrangement is provided which arrests cyclic operation of the punching assembly under the control of the commutator during those intervals in which the setting of the timing circuit is being adjusted. However, it is frequently desirable to permit the uninterrupted completion of the recording operation following its initiation.

Thus, another object of the present invention is to provide a control circuit for a time recorder in which a recording cycle of operation is completed without interruption following its initiation and in which means are provided for maintaining accurate operation of a timing circuit.

Another object is to provide a time recorder including means for arresting the transmission of operating signals to a timing circuit during operation of a connected time recorder and means for storing signals transmitted during this interval and for thereafter applying them to the timing circuit to adjust the setting thereof.

As indicated above, a cycle of operation of the time recorder shown in the above identified application is initiated in response to the insertion of a blank record card into a guideway therefor. In thus conditioning the time recorder for operation, a common drive motor for actuating the punching assembly, the commutator, and a step-by-step feeding mechanism for advancing the card during the punching is placed in operation. If a key is not subsequently inserted into the sensing unit so as to complete the conditioning of the time recorder unit for operation, the drive motor remains in operation following the insertion of the blank record card until such time as a badge is inserted into the sensing unit. This often results in excessive periods of operation for the motor.

Accordingly, another object is to provide an improved control circuit for a drive motor in a recording unit.

A further object of the present invention is to provide a control arrangement for a motor in a time recorder unit by which the motor can selectively be placed in operation either by the conjoint insertion of a record card into the recording assembly and the insertion of a coded badge into the sensing unit, or solely by the insertion of a badge into the sensing unit.

In the prior time recorder unit, the record card is advanced step-by-step relative to the punching assembly by a step-by-step drive assembly including a drive wheel and a shiftable idler which is moved to bias the record card into engagement with the drive wheel when the step-by-step drive assembly is rendered effective. This time recorder unit further includes a card ejecting mechanism for ejecting a punched card from the recorder at the completion of the recording operation. When the ejecting mechanism is operated prior to the release of the step-by-step drive assembly, the shiftable idler in the step-by step drive assembly tends to retard the discharge of the punched card by the ejecting mechanism.

Accordingly, another object of the present invention is to provide means controlled by the operation of an ejecting assembly for rendering a card feeding mechanism ineffective.

A further object is to provide means for shifting an idler in a card feeding assembly out of engagement with a punched card when an ejecting means is operated.

In many instances, the items of information recorded on a record card during a single cycle of rotation of the control commutator is not sufficient to fill all of the available columns on the card. However, in the time recording unit shown in the above identified application, the card is automatically ejected in response to the completion of a single cycle of operation of the commutator so that several different data entries cannot be recorded on a single card.

Another object of the present invention is to provide a control circuit for a time recorder which is effective either to eject a punched record card in response to the recording of a first data entry thereon or to eject the card from the punching assembly after a predetermined number of data entries have been recorded on a single card.

Many other objects and advantages of the present invention will become apparent from a consideration of the following detailed description of an illustrative embodiment thereof in conjunction with the single sheet of drawings which forms a schematic diagram of a time recorder and a control circuit therefor embodying the present invention.

Referring now to the drawing, the time recording unit controlled by the circuit shown therein is of the type disclosed and described in detail in the above identified copending Parsons and Harwood application and generally comprises a punching assembly controlled by a plurality of interposer solenoids 10 which is selectively supplied with information to be recorded from a timing circuit 12 and a badge storage unit 14 under the control of a commutator indicated generally as 16. The badge storage unit 14 comprises a plurality of groups of storage relays which are selectively operated by a badge sensing unit 18 in response to the insertion of a coded badge into the unit 18. When a blank record card is inserted into the punching assembly and a badge is inserted into the sensing unit 18, the digits forming the designation of the employee are stored in the badge storage unit 14 and the inserted card is continuously advanced to a position aligned with the punching assembly in which it is conditioned to receive the first item of information to be recorded thereon. In moving to this position, a control mechanism governed by a one revolution clutch is rendered effective so that a control shaft rotates through a plurality of successive cycles. In each of these cycles, the punching assembly is actuated to punch an item of information in the record card. The record card is advanced a single step, and the commutator 16 is advanced a single step to render the next data storing unit effective to control the operation of the interposer solenoids 10. Following the completion of the recording of the items of information, the continuing rotation of the control shaft is interrupted and the punched card is ejected from the recorder. Alternatively, if a number of separate entries are to be recorded on a single card, the control circuit disables the ejecting means until such time as a predetermined number of complete cycles of operation of the commutator 16 have been completed. At this time, the punched card is ejected and the time recorder unit is restored to a normal condition.

Referring now more specifically to the punching assembly, this assembly is illustrated in detail in the above identified copending application and includes ten movable punch elements which are spaced transversely relative to the record card so that one or more of these punch elements can be blocked against movement under the control of the interposer solenoids 10. Thus, when the punching assembly is actuated, the punch elements associated with the operated interposer solenoids are blocked against movement and are effective to punch the card in positions related to the value of the digit to be recorded.

The details of the timing circuit 12 are also disclosed in detail in the above identified copending application. As illustrated therein, the timing circuit 12 generally consists of a plurality of stepping switches which are serially connected for operation in response to signals supplied to an input conductor 56. Thus, the position of the switches at any given instant represents the digits of instant time. The contact banks of the various stepping switches are connected in common by a cable 57 to the interposer solenoids 10, and the various wipers of the stepping switches in the timing circuit 12 are rendered effective in sequence to control the interposer solenoids 10 by the commutator 16 which is connected to the timing circuit 12 by a cable 59. A conductor 58 interconnecting the timing circuit 12 with the control circuit for the time recorder unit is periodically provided with a positive potential to perform certain control operations in the circuit 12, such as carry and reset functions.

To provide a means for operating the stepping switches in the timing circuit 12 at periodic intervals, a timing motor 50 is provided which is placed in operation by the closure of a switch 51 to rotate a pair of cams 52 and 53. At suitable time intervals, the cam 52 momentarily closes a pair of contacts 52*a* so that a positive potential provided by a suitable potential source 54 is forwarded through the closed contacts 52*a* and through a pair of normally closed contacts 46*c* to be applied to the input conductor 56. This operating signal or pulse advances the lowest ordered one of the serially connected stepping switches a single step, thus representing the expiration of the selected time interval. The cam 53 periodically closes a pair of contacts 53*a* in synchronism with the closure of the contacts 52*a* to forward a positive potential over the conductor 58 for performing such functions as carry and reset operations.

Referring now more specifically to the badge storage unit 14 and the badge sensing unit 18, these units are identical to the similar components shown and described in detail in the above identified copending Parsons and Harwood application. In general, the badge storage unit 14 comprises a plurality of groups of storage relays which are selectively operated by the insertion of a badge into the unit 18 to provide a plurality of conductive paths, each representing one of the digits of the designation of the employee. These conductive paths, which are formed by relay contact decoding "trees" controlled by the storage relays, are connected in common to the interposer solenoids 10 over a cable 61. The various conductive paths formed by the storage relays in the badge storage unit 14 are sequentially rendered effective to control the operation of the interposer solenoids 10 by the commutator 16 which is connected to the badge storage unit 14 by a cable 62.

The badge sensing unit 18 includes a plurality of movable sensing or feeler pins carried on a movable plate. When a badge to be sensed is inserted into the unit 18, a pair of contacts 64 in the control circuit are mechanically engaged and closed to operate a sensing unit actuating solenoid 26. In operating, the solenoid 26 moves the plurality of sensing pins toward the inserted badge so that a plurality of contacts are selectively operated in accordance with the perforations provided in the inserted badge. These contacts are connected by a cable 65 to the badge storage unit 14 so that the operation thereof selectively operates the plurality of storage relays in the badge storage unit 14 to store the digits forming the designation of the employee.

Referring now more specifically to the control circuit for the time recorder unit, in the normal condition of this circuit, a relay 24 is maintained in an operated state by the positive potential provided by the power source 54 which is forwarded through a pair of normally closed contacts 40*a*. In its operated condition, the relay 24 closes a plurality of contacts 24*a*, 24*b*, and 24*c* and opens a pair of contacts 24*d*. The closure of the contacts 24*a* completes a portion of a holding circuit for a relay 22 and a motor control relay 36. The closed contacts 24*b* forward the positive potential provided by the source 54 to the badge storage unit 14 to provide a source of holding potential for the storage relays therein. The opening of the contacts 24*d* interrupts an additional point in the operating circuit for a first counting relay 42, and the closure of the contacts 24*c* performs no useful function at this time.

If the time recorder is to be conditioned for recording several separate data entries on the card prior to its ejection, a selector switch 72 is operated to close a pair of contacts 72*a* and to open a pair of contacts 72*b*. The recorder is then further conditioned for operation by inserting a blank record card into a card guideway extending to the punching assembly. When the card is thus inserted, a switch arrangement 70 is operated to open a pair of normally closed contacts 70*a* and to close a pair of contacts 70*b*. The closure of the contacts 70*b* produces no useful function, but the opening of the contacts 70*a* interrupts an additional point in a circuit for initiating operation of the recorder. The coded key or badge of the employee whose identification is to be recorded on the record card in conjunction with instant time is then inserted into the badge sensing unit 18 so that the contacts 64 are closed. The closure of the contacts 64 extends the positive potential provided by the source 54 through the closed contacts 72*a* and a pair of normally closed contacts 40*c* to complete an obvious operating circuit for a motor control relay 36. The operation of the relay 36 closes a pair of contacts 36a so that a common drive motor 38 for the time recorder unit is connected to a suitable source of power and thus placed in operation.

The positive potential provided at the closed contacts 64 is also forwarded through a pair of normally closed contacts 22a to complete an operating circuit for a slow-to-release relay 20 and directly to the operating winding of a slow-to-operate relay 22. The relay 20 operates immediately to close a pair of contacts 20a. The closure of the contacts 20a operates the solenoid 26 so that the sensing pins in the badge sensing unit 18 are moved toward the inserted key, thereby selectively operating the sensing contacts so that a coded representation of the digits forming the designation of the employee is stored in the badge storage unit 14 by the selective operation of a plurality of the storage relays therein. The selective operation of these relays prepares a plurality of conductive paths, each representing one of the digits of the employee designation.

After the slow-to-operate interval of the relay 22, this relay operates to open the contacts 22a and to close a plurality of contacts 22b–22e. The closure of the contacts 22b completes a holding circuit for the relay 22 so that this relay is maintained operated. The closure of the contacts 22b also completes a holding circuit for the motor control relay 36 extending through the closed contacts 24a and 40c. The opening of the contacts 22a interrupts the operating circuit for the relay 20 so that this relay releases after its delay interval to open the contacts 20a. The opening of the contacts 20a releases the solenoid 26 so that the sensing pins in the badge sensing unit 18 are withdrawn from the apertures in the inserted key. This permits the inserted key to be removed from the badge sensing unit so that the contacts 64 are opened. However, the opening of the contacts 64 does not release the relays 22 and 36 due to the prior completion of the holding circuits therefor. The closure of the contacts 22c prepares an operating circuit for a punch relay 30, which circuit is interrupted at the open contacts 70a. The closure of the contacts 22d similarly prepares an operating circuit for a relay 28.

The closure of the contacts 22e extends the positive potential provided by the source 54 through the closed contacts 72a and a pair of normally closed contacts 28f to operate a feed roll solenoid 74. As described in detail in the above identified copending Parsons and Harwood application, the operation of the solenoid 74 engages a first continuous drive mechanism so that the leading edge of the blank record card inserted into the record guideway is advanced into engagement with a card locating gate which arrests movement of the card in a position to receive the first item of information to be recorded thereon. As the trailing edge of the card moves beyond the switch 70, the contacts 70b are opened and the contacts 70a are closed. The closure of the contacts 70a concurrently completes an operating circuit for the relays 28 and 30.

More specifically, the closure of the contacts 70a forwards the positive potential provided by the source 54 through the closed contacts 72a, 70a, and 22d and a plurality of normally closed contacts 28b and 40b to energize the winding of the relay 28. In operating, the relay 28 opens the contacts 28b and closes a plurality of contacts 28a, and 28c–28g. The contacts 28a and 28b form a make-before-break contact arrangement so that the closure of the contacts 28a completes a holding circuit for the relay 28 extending to the positive potential provided at the source 54 prior to the opening of the contacts 28b. The closure of the contacts 28e provides a shunt around the contacts 70a to prevent the insertion of a card into the guideway from disturbing the present operation of the control circuit.

The opening of the contacts 28f interrupts the above described operating circuit for the feed roll solenoid 74 so that this solenoid is released to render the continuous drive mechanism for advancing the card to a punching position ineffective. The closure of the contacts 28d prepares a portion of an operating circuit for a clutch solenoid 32 and card stop solenoid 34, which circuit is interrupted at a pair of normally open contacts 30a. The closure of the contacts 28c forwards the positive potential provided at the closed contacts 28e and 70a through a pair of normally closed contacts 76a to energize an index feed roll solenoid 78. The energization of the solenoid 78 moves an idler roller in a step-by-step card feeding mechanism into engagement with the inserted record card to press this card into driving engagement with a wheel which is subsequently indexed to feed the card step-by-step during the punching operation. The closure of the contacts 28g prepares a further holding circuit for the relay 36.

Referring back to the above described closure of the contacts 70a, the positive potential provided at these closed contacts is forwarded through the closed contacts 22c to complete an obvious operating circuit for a relay 30. In operating, the relay 30 closes the contacts 30a. The closure of the contacts 30a completes an operating circuit for the solenoids 32 and 34. The operation of the card stop or gate solenoid 34 raises the gate against which the leading edge of the advanced card has been moved to permit this card to be advanced step-by-step during the punching operation under the control of the indexing feed assembly. In moving upwardly, the gate actuates a switch, as described in detail in the above identified copending Parsons and Harwood application, to close a pair of contacts 34a. The closure of the contacts 34a completes an additional holding circuit for the relay 28 so as to maintain this relay energized until the punched card has been ejected from the punching assembly. The operation of the clutch solenoid 32 engages the one revolution clutch so that a control shaft is placed in continuous operation. During each cycle of rotation of the control shaft, the punching assembly controlled by the interposer solenoids 10 is actuated, the drive wheel in the indexing drive assembly controlled by the solenoid 78 is advanced through an increment of rotary movement to advance the record card a single step, and the commutator 16 is advanced a single step.

The operation of the recording assembly now continues under the control of the control shaft, as described in detail in the above identified copending Parsons and Harwood application. More specifically, following the operation of the clutch solenoid 32, the rotation of the control shaft advances a cam 50 so that a pair of contacts 80a are closed. Thus, the positive potential supplied at the closed contacts 22c is forwarded to a common conductive segment 82 in the commutator 16 and then forwarded over a wiper 84 to the first of the individual contacts 86 included in the commutator 16. As shown in the drawing, the first contact 86 is connected by the cable 62 to the badge storage unit 14. Thus, this positive potential is forwarded over the conductive path provided by the relay contact "tree" of the group of storage relays in which is stored the first digit of the designation of the employee. This positive potential is forwarded by the badge storage unit 14 over the cable 61 to operate a selected one of the interposer solenoids 10 representing the value of the first digit. Following the operation of the proper interposer solenoid 10, the punching assembly is actuated by the control shaft, the indexing drive is operated to advance the card a single step, the cam 80 advances to open the contacts 80a thus releasing the operated interposer solenoid, and the commutator 16 is advanced a single step so that the wiper 84 interconnects the common conductive segment 82 with the contact 86 forming a second position of the commutator 16.

The continuing rotation of the control shaft under the control of the energized clutch solenoid 32 causes the perforation of the remaining items of information stored in the badge storage unit 14 and the items of information provided by the timing circuit 12 in the manner described in detail above. When the wiper 84 moves into its last position and the cam 80 closes the contacts 80*a*, an obvious operating circuit is completed for an end-of-cycle relay 40. The operation of the relay 40 opens the contacts 40*a*–40*c* and closes a plurality of contacts 40*d* and 40*e*.

The opening of the contacts 40*b* interrupts one holding circuit for the relay 28, but this relay remains operated over the holding circuit completed at the closed contacts 34*a*. The closure of the contacts 40*d* completes a holding circuit for the motor control relay 36 extending through the closed contacts 28*g* so that this relay is not released to stop the motor 38 when the contacts 40*c* are opened to interrupt the above described operating and holding circuit for the relay 36. The closure of the contacts 40*e* prepares an operating circuit for a solenoid 76 controlling the card ejecting mechanism. However, as described above, the selector switch 72 is in a position in which the contacts 72*b* are opened and, accordingly, the circuit prepared by the closure of the contacts 40*e* is not completed and the ejecting mechanism is not operated. This operation is in accordance with the conditioning of the control circuit for recording a plurality of data entries on a single record card.

The opening of the contacts 40*a* interrupts the above described operating circuit for the reset relay 24 so that this relay releases to open the contacts 24*a*, 24*b* and 24*c* and to close the contacts 24*d*. The opening of the contacts 24*b* interrupts the holding circuits for the operated relays in the badge storage unit 14 so that these relays are released to clear the unit 14 for subsequent operation under the control of the badge sensing unit 18. The opening of the contacts 24*a* interrupts the above described holding circuit for the relay 22 so that this relay releases to close the contacts 22*a* and to open the contacts 22*b*–22*e*. The opening of the contacts 22*b* interrupts an additional point in the holding circuit for the relay 22, and the opening of the contacts 22*e* interrupts an additional point in the operating circuit for the feed roll solenoid 74. The opening of the contacts 22*d* interrupts an additional point in the previously interrupted operating circuit for the relay 28, and the closure of the contacts 22*a* prepares the above described operating circuit for the relay 20.

The opening of the contacts 22*c* interrupts the above described operating circuit for the clutch relay 30 so that this relay releases to open the contacts 30*a*. The opening of the contacts 30*a* releases the clutch solenoid 32 and the gate solenoid 34. The release of the gate solenoid 34 permits the card stop or locating gate to move downwardly toward a card intercepting position. However, since a record card is now in the guideway, the gate controlled by the solenoid 34 does not move to its lowermost position and thus the contacts 34*a* controlled thereby remain closed and maintain the relay 28 in an operated condition. The release of the clutch solenoid 32 disengages the one revolution clutch so that, when the control shaft completes the present cycle of rotation, additional cycles of rotation thereof are not initiated. Thus, the release of the clutch solenoid 32 arrests further operation of the indexing drive mechanism, the commutator 16, and the punching assembly.

Referring back to the above described release of the relay 24, the closure of the contacts 24*d* completes an operating circuit for the first counting relay 42 which extends from the positive potential provided at the closed contacts 34*a* through the closed contacts 24*d* and a pair of normally closed contacts 44*e*. In operating, the relay 42 closes a plurality of contacts 42*a*—42*c* and 42*e* and opens a pair of contacts 42*d*. The closure of the contacts 42*b* prepares a holding circuit for the relay 42. The closure of the contacts 42*c* prepares an operating circuit for a second counting relay 44. The opening of the contacts 42*d* interrupts an additional point in another operating circuit for the first counting relay 42, and the closure of the contacts 42*e* prepares a portion of an operating circuit for the ejecting solenoid 76.

During the last cycle of rotation of the control shaft, the rotation of the cam 80 opens the contacts 80*a* so that the above described operating circuit for the relay 40 is interrupted, thus releasing this relay. In releasing, the relay 40 closes the contacts 40*a*–40*c* and opens the contacts 40*d* and 40*e*. The opening of the contacts 40*e* interrupts an additional point in the operating circuit for the ejecting solenoid 76, and the closure of the contacts 40*b* completes an additional holding circuit for the relay 28. The closure of the contacts 40*c* prepares an operating circuit for the motor control relay 36, and the opening of the contacts 40*d* interrupts the holding circuit for the relay 36 so that this relay releases to open the contacts 36*a*. The opening of the contacts 36*a* stops the motor 38. The closure of the contacts 40*a* completes the above described operating circuit for the relay 24 so that this relay operates to open the contacts 24*a* and 24*c* and to close the contacts 24*b* and 24*d*.

The closure of the contacts 24*b* forwards holding potential to the badge storage unit 14, and the closure of the contacts 24*a* prepares the above described holding circuit for the relay 22 and the motor control relay 36. The contacts 24*c* and 24*d* form a make-before-break contact arrangement so that the closure of the contacts 24*c* completes a holding circuit for the first counting relay 42 extending through the closed contacts 24*c*, 42*b* and 44*e* prior to the opening of the contacts 24*b* to interrupt the above described operating circuit for this relay. Thus, the first counting relay 42 remains operated to indicate that a first cycle of operation of the commutator 16 has been completed during which the first data entry has been recorded on the record card. Further, during the last cycle of rotation of the control shaft, the wiper 84 is returned to its normal home position in which it interconnects the common conductive segment 82 and the contact 86 forming the first stepping position of the commutator 16.

Accordingly, at this time, a first data entry comprising the badge number of an employee and the time at which the badge was inserted into the badge sensing unit 18 together with other desirable items of information has been recorded on the record card, the commutator 16 has been returned to a normal home position, and the first counting relay 42 has been operated to indicate the completion of a first cycle of operation of the time recorder unit. Further, the motor 38 has been stopped at the completion of the recording operation to avoid excessive operation thereof, and the record card on which the first data entry has been made has been advanced to a position in which it is capable of receiving the first item of information to be recorded in the second data entry. Also, the reset relay 24 has been released to clear the badge storage unit 14 and reoperated to forward a holding potential thereto. The control circuit in the time recorder unit remains in this condition until such time as the next badge is inserted into the sensing unit 18.

When the next time entry for the next employee is to be made, a coded badge is again inserted into the sensing unit 18 so that the contacts 64 are again closed to sequentially operate the relays 20 and 22. The sequential operation of these relays again causes the sensing of the inserted key and the storage of the designation of the employee in the badge storage unit 14. The control circuit then places the timer recorder unit in operation to record the items of information forming the second data entry on the card in the same manner as described above, with the following exception. Inasmuch as the card has not been ejected from the recorder at the completion of the recording of the first data entry, the contacts 70*a* and 70*b* are not again operated. Further, since the partially punched record card remains in the recorder, the contacts 34*a* are held closed to maintain the relay 28 in an operated condition. Thus, the contacts 28*e* and 70*a* remain closed so that, as soon as the contacts 22*c* are closed by the operation of the relay 22, a positive potential is again forwarded to the contacts 80*a* and to operate the punch relay 30 so that the second cycle of operation of the commutator 16 is initiated. During this cycle, the items of information forming the second data entry are recorded on the record card immediately following the items of information forming the first data entry thereon.

When the commutator 16 approaches the end of its second cycle of operation and, more specifically, when the wiper 84 is moved into engagement with the next to the last contact 86 and the cam 80 closes the contacts 80*a*, a positive potential is forwarded through a rectifier 88 and the closed contacts 42*c* to complete an obvious operating circuit for the second counting relay 44. The relay 44, in operating, closes a plurality of contacts 44*a*–44*d* and 44*f* and opens the contacts 44*e*. The closure of the contacts 44*a* completes a holding circuit extending to the positive potential provided by the closed contacts 34*a* for maintaining the relay 44 operated. The closure of the contacts 44*c* prepares a holding circuit for the relay 42. The closure of the contacts 44*b* and 44*d* prepares a portion of an operating circuit for the relay 42. The closure of the contacts 44*f* prepares an operating circuit for the ejecting solenoid 76, which circuit is interrupted at the open contacts 40*e*. The opening of the contacts 44*e* interrupts the above described holding circuit for the first counting relay 42 so that this relay releases to open the contacts 42*a*–42*c* and 42*e* and to close the contacts 42*d*.

The opening of the contacts 42*a* interrupts a point in a holding circuit for the relay 42, and the opening of the contacts 42*b* interrupts an additional point in the previously opened holding circuit for the relay 42. The opening of the contacts 42*c* interrupts the above described operating circuit for the second counting relay 44, but this relay remains operated over the holding circuit completed at the closed contacts 44*a*. The closure of the contacts 42*d* prepares an operating circuit for the relay 42 which is connected to the third from the last contact 86 in the commutator 16. The opening of the contacts 42*e* interrupts a point in the operating circuit for the ejection solenoid 76.

When the commutator 16 is advanced to its next stepping position, the above described operating circuit for the end-of-cycle relay 40 is completed so that this relay operates to open the contacts 40*a*–40*c* and to close the contacts 40*d* and 40*e*. The operation of the end-of-cycle relay 40 performs the same functions as described above except that the release of the relay 24 in actuating the contacts 24*c* and 24*d* performs no useful function due to the prior opening of the contacts 42*e*. Thus, when the commutator 16 is advanced to its home position and the end-of-cycle relay 40 is again released to cause the reoperation of the relay 24, the control circuit associated with the time recorder unit is restored to the condition described above with the exception that the first counting relay 42 is now in the released condition and the second counting relay 44 is in an operated condition. Further, at this time the record card has been provided with two separate data entries and has not been ejected from the time recorder unit. The time recorder and the control circuit remain in this condition until such time as another coded key is inserted into the badge sensing unit 18.

When the third successive badge or key is inserted into the sensing unit 18, the time recorder unit and the control circuits therefor are placed in operation, as described above, so that the items of information pertaining to the designation of the employee and the time together with other items of information are recorded on the punched card as the third data entry thereon. During this operation, when the commutator 16 is advanced to the third from the last stepping position thereof and the cam 80 closes the contacts 80*a*, the positive potential provided by the common conductive segment 82 and the wiper 84 is forwarded through a blocking diode 90 and the closed contacts 42*d*, 44*b* and 44*d* to again complete an operating circuit for the first counting relay 42. This relay now operates to again close the contacts 42*a*–42*c* and 42*e* and to open the contacts 42*d*. The closure of the contacts 42*a* completes a holding circuit for the relay 42 extending to the positive potential provided at the closed contacts 34*a* so that the opening of the contacts 42*d* to interrupt the above described operating circuit does not release the first counting relay 42. Since the second counting relay 44 is held in an operated condition by the holding circuit extending through the closed contacts 44*a*, the closure of the contacts 42*c* produces no useful function. Similarly, the closure of the contacts 42*b* performs no useful function at this time. The closure of the contacts 42*e* prepares an operating circuit for the ejecting solenoid 76 so that this solenoid is operated at the completion of the third cycle of operation of the commutator 16 to eject the record card which now includes three separate data entries.

Thus, when the commutator 16 is advanced to its last stepping position, the end-of-cycle relay 40 is again operated to produce the functions described above. However, when the relay 40 is operated at this time, the closure of the contacts 40*e* completes an obvious operating circuit extending through the closed contacts 42*e* and 44*f* for the ejecting solenoid 76. In operating, the solenoid 76 opens the contacts 76*a* to interrupt the energizing circuit for the index roll solenoid 78, thereby shifting the idler out of engagement with the card to free it for ejection by the ejecting mechanism. The operation of the solenoid 76 also actuates an ejecting mechanism of the type disclosed in detail in the above identified copending Parsons and Harwood application so that the record card is ejected from the time recorder unit.

As the trailing edge of the card passes beyond the lower edge of the card locating gate, which has been released by the release of the gate solenoid 34, the contacts 34*a* are opened. The opening of these contacts together with the opening of the contacts 40*b* due to the operation of the end-of-cycle relay 40 interrupts both of the holding circuits for the card relay 28 so that this relay releases to restore the contacts controlled thereby to their normal condition. The opening of these contacts also releases the relays 42 and 44 and the solenoid 76. The remainder of the control circuit associated with the time recorder unit is restored to its normal condition by the operation and release of the end-of-cycle relay 40 in the manner described in detail above. Thus, the completion of the recording of three separate data entries on the record card results in the operation of the ejection solenoid 76 to eject the perforated card from the time recorder unit and in the restoration of the control circuit to a normal condition in which it is capable of being placed in operation only by the insertion of a blank record card and by the insertion of a key to be sensed into the unit 18.

If the time recorder unit is to be operated so that only a single data entry is to be recorded on each record card, the selector switch 72 is operated so that the contacts 72*a* are opened and the contacts 72*b* are closed. The closure of the contacts 72*b* completes a shunt around the contacts 42*e* and 44*f* controlled by the first and second counting relays 42 and 44 so that each time the end-of-cycle relay 40 is operated to close the contacts 40*e*, the ejecting solenoid 76 is actuated to eject the card from the time recorder unit. Thus, only a single data entry can be recorded on each card inserted into the time recorder unit. Further, the opening of the contacts 72*a* removes the shunting circuit for forwarding the positive potential directly to the contacts 64 controlled by the badge sensing unit 18 so that it is no longer possible to place the control circuit in operation merely by inserting a key into the badge sensing unit. Accordingly, the time recorder unit can be placed in operation only by both inserting a blank record card into the guideway therefor so as to operate the switch 70 and inserting a coded key. Further, since the motor control relay 36 can only be operated over a circuit including both of the contacts 70*b* and 64, it is not possible to place the drive motor 38 in operation without both inserting a key into the badge sensing unit 18 and inserting a blank record card into the card receiving guideway therefor. Thus, the selective operation of the selector switch 72 conditions the time recorder unit and the control circuit therefor either for an operation in which a plurality of separate data entries are recorded on a single record card or one in which only a single data entry is recorded on the card following which the punched card is ejected from the time recorder unit.

As set forth in detail in the above identified copending Parsons and Harwood application, it is necessary to avoid concurrent adjustment of the settings of the stepping switches in the timing circuit 12 and the recording of time information under the control of the interposer solenoids 10 in order to avoid the recording of an inaccurate time entry on the record card. In the above identified copending application, means are provided for arresting cyclic operation of the time recorder and of the commutator during the period in which the setting of the timing circuit is being adjusted. However, in the control circuit of the present invention, means are provided which positively prevent the concurrent adjustment of the settings of the timing circuit and recording of time information without also interruping the normal cycle of recording operation of the time recorder unit.

This means includes a cam 92 which is carried on the shaft to which the wiper 84 is connected and which is driven in synchronism with the shaft for advancing the wiper 84. The cam 92 is so disposed in a synchronous drive relationship with the wiper 84 that when the wiper 84 is in engagement with the contacts 86 to which the timing circuit 12 is connected, the cam 92 closes a pair of contacts 92*a*, thereby completing an obvious operating circuit for a time interlock relay 46. The operation of the relay 46 opens the contacts 46*c* and a pair of contacts 46*a* and closes a pair of contacts 46*b*. The opening of the contacts 46*c* interrupts the above described path extending over the conductor 56 from the contacts 52*a* for applying operating signals to the timing circuit 12. Thus, the operation of the relay 46 positively prevents the transmission of operating signals to the timing circuit 12 during the interval in which time information is being recorded by the time recorder unit. The closure of the contacts 46*b* interconnects the contacts 52*a* with a condenser 94. If the contacts 52*a* are closed during the operation of the time recorder unit, the positive potential charges the condenser 94 to store the operating signal for subsequent transmission to the timing circuit 12.

When the commutator 16 is advanced beyond the positions in which time information is recorded, the cam 92 opens the contacts 92*a* to release the timing interlock relay 46. In releasing, the relay 46 closes the contacts 46*c* to establish the normal operating circuit including the conductor 56 for supplying operating pulses to the timing circuit 12. The closure of the contacts 46*a* interconnects the storage condenser 94 with the conductor 56 through a blocking diode 96. The condenser 94, if charged, discharges over the path including the diode 96 and the conductor 56 to supply an operating signal to the timing circuit 12 to correct the settings of the stepping switches therein. The opening of the contacts 46*b* interrupts the above described circuit extending between the storage condenser 94 and the contacts 52*a*. Thus, the operation of the time interlock relay 46 provides means for preventing an adjustment of the settings of the stepping switches in the timing circuit 12 during the interval in which time information is recorded on the record card and this relay, together with the storage condenser 94, provides means for storing any operating signal which is supplied during the interlock interval and for subsequently transmitting it to the timing circuit 12.

Accordingly, the time recorder unit of the present invention together with the control means therefor provides means for selectively recording one or a plurality of separate data entries on a record card and for modifying the operation of the control circuit to accomplish either of these two types of operation. Further, the control circuit includes new and improved means for preventing the concurrent adjustment of a timing source and recording of information provided by the timing source. This latter means comprises means for interrupting the supply of operating signals to the timing circuit during the interval in which recording takes place and means for storing operating signals provided during this interval and subsequently applying them to the timing circuit following the completion of the time recording portion of the cycle of operation of the time recorder unit.

Although the present invention has been described in conjunction with a single embodiment thereof, it is obvious that numerous embodiments may be devised by those skilled in the art which will fall within the spirit and scope of the principles of this invention.

What is claimed and desired to be secured by Letters Patent of the United States is:

1. In a recorder using record cards, a recording assembly, switching means operatively connected to said assembly and operable through successive cycles of operation for selectively operating said recording assembly to record data on said record cards, ejecting means operatively associated with said assembly for ejecting a card from said recording assembly, and control means operatively associated with said ejecting means and including counting means for operating said ejecting means in response to the completion of different selected numbers of cycles of operation of said switching means.

2. In a recorder using record cards, a recording assembly, switching means connected to said recording assembly and operable through successive cycles of operation for operating said recording assembly, ejecting means operatively associated with said assembly for ejecting a card from said recording assembly, first means operatively associated with said ejecting means for operating said ejecting means at the end of each cycle of operation of said switching means, second means operatively associated with said ejecting means for operating said ejecting means at the end of a selected number of said cycles of operation greater than one, and selecting means operatively connected to said first means and to said second means for rendering one of said first and second means effective.

3. The recorder set forth in claim 2 in which said second means includes counting means operated in response to the completion of each cycle of operation of said switching means.

4. In a recorder using record cards, a recording assembly, switching means operatively associated to said assembly and operable through successive cycles of operation for operating said recording assembly to record data on said record card, counting means operatively associated with said switching means and operated by said switching means in response to each cycle of operation thereof for storing information representing the number of completed cycles, means operatively associated with said assembly for ejecting a card from said recording assembly, and means controlled by said counting means for operating said ejecting means only after said switching means has operated through a predetermined number of cycles greater than one.

5. In a recorder using record cards, a recording assembly, means operatively associated with said assembly for intermittently advancing a card relative to said recording assembly, means operatively associated with said assembly for storing data, a commutator operatively associated with the two above-mentioned means and operable through a sequence of successive steps in synchronism with operation of said card advancing means for connecting said recording assembly to said data storing means, a counting circuit operatively connected to said commutator and operated by each operation of said commutator through said sequence of successive steps, card ejecting means operatively associated with said assembly for ejecting a record card from said recording assembly, and means controlled by said counting means for operating said ejecting means only after said commutator has completed a selected number of said sequences of successive steps greater than one.

6. A recording unit adapted for use with keys bearing indicia representing data to be recorded, comprising a recorder adapted to receive a record medium, sensing means operatively connected to said recorder and adapted to removably receive one of said keys for sensing the indicia thereon, means controlled by said sensing means for operating said recorder to record the data represented by the sensed indicia, control means operatively connected to said sensing means and actuated by the insertion of a key into said sensing unit for operating said sensing unit to sense the inserted key, and means operatively connected to said control means and controlled by the presence or absence of a record medium in said recorder for conditioning said control means for operation only when a record medium has been inserted into said recorder.

7. A recording unit for use with keys bearing designation representing indicia, comprising a recorder adapted to receive a record medium, data storing means connected to said recorder for storing data to be recorded by said recorder, a sensing unit adapted to removably receive one of said keys for sensing indicia thereon, said sensing unit being connected to said data storing unit so that said sensing unit operates said data storing means to store the designation represented by the sensed indicia, control means operatively associated to said sensing means and responsive to the insertion of a key into said sensing unit for actuating said sensing unit to sense the inserted key, and means operatively connected to said control means and responsive to the presence or absence of a record medium in said recorder for preventing the operation of said control means until a record medium is inserted into said recorder.

8. A recording unit for use with keys having indicia representing data to be recorded, a recorder adapted to receive a record card, a sensing unit for sensing the indicia on a removably inserted key and connected to supply data to said recorder, first control means controlled by the insertion of a key into said sensing unit for actuating said sensing unit to sense the inserted key, second control means controlled by the presence or absence of a record card in said recorder for conditioning said first control means for operation only when a card is provided in said recorder, switching means operatively connected with said first control means and operable through successive cycles for supplying data provided by said sensing unit to said recorder, ejecting means operatively associated with said recorder for ejecting a card from said recorder, and selector means operatively associated with said ejecting means for conditioning said ejecting means for operation at the end of one or more cycles of operation of said switching means, said selector means including means for disabling said second control means when said ejecting means is to be operated at the end of more than one cycle of said switching means.

9. A recording unit for use with keys having data representing indicia, comprising a recorder adapted to record data on a record card, sensing means operatively associated with said recorder and adapted to sense an inserted key for supplying operating signals to said recorder in accordance with the sensed indicia, first control means responsive to the insertion of a key into said sensing unit for operating said unit, second control means controlled by the presence of a record card in said recorder for conditioning said first control means for operation, recorder control means controlled by said sensing means operatively connected to said recorder for operating said recorder selectively to record data fom a single sensed key on a card or to record data from a group of successively sensed keys on a single card, and means operatively connected to said second control means for disabling said second control means when said recorder control means operates said recorder to record data pertaining to a plurality of successively sensed keys on a single card.

10. In a recorder adapted for use with indicia bearing keys, record card punching and feeding means for punching data entries on spaced portions of a record card, a sensing unit operatively connected to said recorder and adapted to sense the indicia on an inserted key to provide data for recording by said card punching and feeding means, a motor operatively connected to drive said card punching and feeding means, first means controlled by the insertion of a key into said sensing unit and by the insertion of a record card into said card punching and feeding means for starting said motor, second means controlled by only the insertion of a key into said sensing unit for starting said motor, and selector means operatively associated with said first means and said second means for selectively rendering either said first means or said second means effective to control the starting of said motor.

References Cited in the file of this patent

UNITED STATES PATENTS

| | | |
|---|---|---|
| 788,760 | Emley | May 2, 1905 |
| 1,348,791 | Evans | Aug. 3, 1920 |
| 2,196,194 | Cooper | Apr. 9, 1940 |
| 2,338,180 | Harrison | Jan. 4, 1944 |
| 2,344,397 | Cooney | Mar. 21, 1944 |
| 2,407,020 | Kraus | Sept. 3, 1946 |
| 2,545,460 | Hall | Mar. 20, 1951 |
| 2,734,743 | Spurlino et al. | Feb. 14, 1956 |
| 2,810,621 | Hibbard et al. | Oct. 22, 1957 |
| 2,825,561 | Sobisch | Mar. 4, 1958 |
| 2,838,361 | Findlay et al. | June 10, 1958 |